(12) United States Patent
Hao et al.

(10) Patent No.: US 10,348,610 B2
(45) Date of Patent: Jul. 9, 2019

(54) METHOD AND APPARATUS FOR MINIMUM LABEL BANDWIDTH GUARANTEED PATH FOR SEGMENT ROUTING

(71) Applicants: Fang Hao, Morganville, NJ (US);
Murali Kodialam, Marlboro, NJ (US);
T. V. Lakshman, Marlboro, NJ (US);
Ehsan Rezaaifar, Ottawa (CA)

(72) Inventors: Fang Hao, Morganville, NJ (US);
Murali Kodialam, Marlboro, NJ (US);
T. V. Lakshman, Marlboro, NJ (US);
Ehsan Rezaaifar, Ottawa (CA)

(73) Assignees: ALCATEL LUCENT, Nozay (FR);
NOKIA OF AMERICA CORPORATION, Murray Hill, NJ (US)

( * ) Notice: Subject to any disclaimer, the term of this patent is extended or adjusted under 35 U.S.C. 154(b) by 119 days.

(21) Appl. No.: 15/605,749

(22) Filed: May 25, 2017

(65) Prior Publication Data

US 2018/0343193 A1   Nov. 29, 2018

(51) Int. Cl.
*H04L 12/749* (2013.01)
*H04L 12/729* (2013.01)
*H04L 12/733* (2013.01)
*H04L 12/723* (2013.01)
*H04L 12/721* (2013.01)
*H04L 12/741* (2013.01)

(52) U.S. Cl.
CPC ............ *H04L 45/125* (2013.01); *H04L 45/20* (2013.01); *H04L 45/34* (2013.01); *H04L 45/50* (2013.01); *H04L 45/745* (2013.01)

(58) Field of Classification Search
CPC ... H04L 49/309; H04L 49/3009; H04L 45/74; H04L 29/0653; H04L 29/06095
USPC ......................................................... 370/392
See application file for complete search history.

(56) References Cited

U.S. PATENT DOCUMENTS

| 9,794,165 | B1* | 10/2017 | Wood ..................... H04L 45/507 |
| 2003/0189919 | A1* | 10/2003 | Gupta .................... H04L 41/044 370/351 |
| 2004/0042406 | A1* | 3/2004 | Wu ......................... H04L 45/02 370/238 |

(Continued)

OTHER PUBLICATIONS

Filsfils, et al., "Segment Routing Architecture", draft-ietf-spring-segment-routing-12, Network Working Group, Internet Draft, Jun. 2017, 28 pages.

(Continued)

*Primary Examiner* — Robert J Lopata
(74) *Attorney, Agent, or Firm* — Kramer Amado, P.C.

(57) ABSTRACT

Various embodiments relate to a non-transitory computer readable medium and method thereof for finding a minimum hop path in a segment graph traversing the least number of links in a physical topology, the method including receiving a connection request for a connection between a source node and a destination node, computing the segment graph, the segment graph having a plurality of links, computing a bandwidth for each of the plurality of links in the segment graph, computing the number of links for a shortest path ("N(q)") for each of the plurality of links, eliminating each of the plurality of link with a bandwidth less than the minimum bandwidth and selecting the shortest path in the physical topology between the plurality of links.

12 Claims, 11 Drawing Sheets

(56) References Cited

U.S. PATENT DOCUMENTS

| | | | | |
|---|---|---|---|---|
| 2005/0249121 | A1* | 11/2005 | Matsunaga | H04L 45/00 370/238 |
| 2006/0224813 | A1* | 10/2006 | Rooholamini | H04L 45/00 710/316 |
| 2009/0207728 | A1* | 8/2009 | Bryant | H04L 45/02 370/225 |
| 2009/0257446 | A1* | 10/2009 | Zhao | H04L 12/2878 370/468 |
| 2010/0157794 | A1* | 6/2010 | Nakash | H04L 45/02 370/228 |
| 2010/0265831 | A1* | 10/2010 | Hachiya | H04L 49/3009 370/248 |
| 2012/0201241 | A1* | 8/2012 | Subramanian | H04L 45/02 370/389 |
| 2013/0242804 | A1* | 9/2013 | Yabusaki | H04L 41/0893 370/255 |
| 2013/0254195 | A1* | 9/2013 | Chen | H04L 47/122 707/736 |
| 2014/0119181 | A1* | 5/2014 | Jain | H04L 45/125 370/235 |
| 2015/0063112 | A1* | 3/2015 | Wu | H04L 45/302 370/235 |
| 2015/0381486 | A1* | 12/2015 | Xiao | H04L 45/70 370/237 |
| 2016/0036689 | A1* | 2/2016 | Avci | H04L 45/121 370/235 |
| 2016/0112327 | A1* | 4/2016 | Morris | H04L 47/127 398/45 |
| 2016/0226701 | A1* | 8/2016 | Luo | H04L 45/02 |
| 2016/0344615 | A1* | 11/2016 | Hao | H04L 45/124 |
| 2016/0359728 | A1* | 12/2016 | Ficara | H04L 45/14 |
| 2017/0207993 | A1* | 7/2017 | Stone | H04L 45/02 |
| 2017/0331722 | A1* | 11/2017 | Greenbaum | H04L 45/124 |
| 2018/0295529 | A1* | 10/2018 | Jen | H04W 24/02 |

OTHER PUBLICATIONS

Filsfils, et al., "Segment Routing with MPLS data plane", data-ietf-sprig-segment-routing-mpls-06, Network Working Group, Internet—Draft, Jun. 2017, 15 pages.

"Notification of Transmittal of the International Search Report", and the Written Opinion of the International Searching Authority, or the Declaration mailed for PCT/US2018/034543 dated Aug. 29, 2018.

Filsfils, et al., "Segment Routing Architecture: draft-ietf-spring-segment-routing-11.txt", Internet Engineering Task Force, IETF; Standardworkingdraft, Internet Society (ISOC) 4, Rue des Falaises CH-1205 Geneva, CH Feb. 16, 2017 (pp. 1-28).

Lee, et al., "An efficient routing algorithm based on segment routing in software-defined networking", Computer Networks, Elsevier, Amsterdam, NL, vol. 103, Apr. 8, 2016, pp. 44-55.

* cited by examiner

Link $q = (1,4)$ in the Segment Cover Graph

FIG. 3C

Corresponding shortest path $SP(q)$ in the Physical Topology

The number next to link $e$ is $f_q(e)$

Segment Graph $G^S$ $\bar{c}(q) = 10$ $\bar{c}(q) = 5$

METHOD AND APPARATUS FOR MINIMUM LABEL BANDWIDTH GUARANTEED PATH FOR SEGMENT ROUTING

TECHNICAL FIELD

This disclosure relates generally to segment routing, and more specifically, but not exclusively, to using shortest path fragments to transfer packets from a source node to a destination node and to instantiate a bandwidth guaranteed path.

BACKGROUND

The goal of segment routing is to create flexible connection routing in IP/MPLS networks by building on features of existing network protocols. The concept of segment routing is to use a sequence of segments to compose the desired end-to-end connection path.

The path between the end points of each segment is determined by a conventional routing protocol like Open Shortest Path First ("OSPF").

The segment labels are carried in the packet header and so a per-flow state is maintained only at the ingress node. A segment label is similar to a Multiprotocol Label Switching ("MPLS") label and traditional operations such as: push, pop, swap actions can be applied to it by the routers on the segment path.

Segment routing permits control of the routing paths and therefore segment routing can be used to distribute traffic for improved network utilization.

A central controller can utilize the full potential of segment routing by selecting segments based on the traffic pattern to judiciously distribute traffic in the network and avoid local traffic hot-spots.

Figure 1:
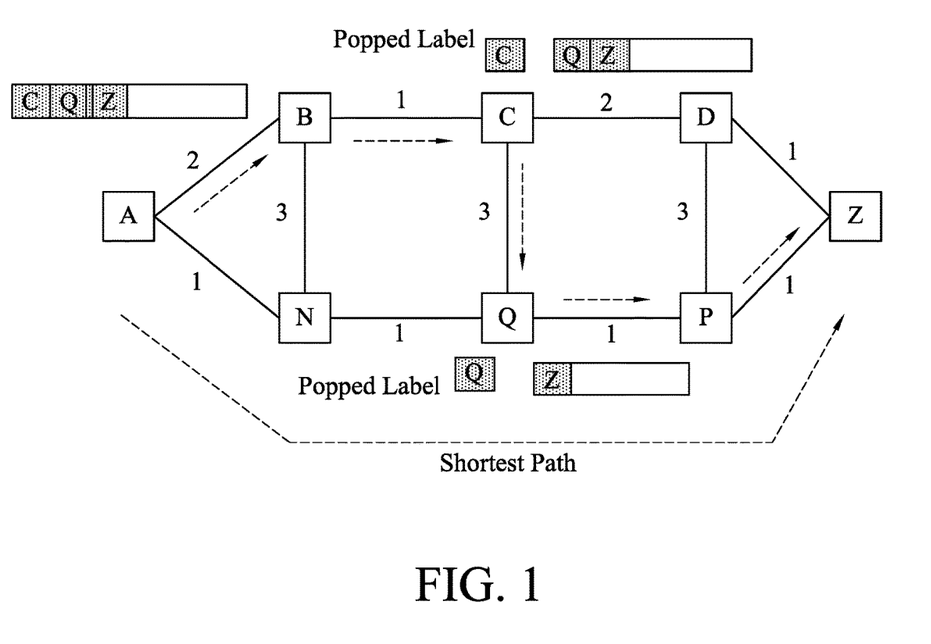
FIG. 1 illustrates an example of segment routing in a network with bi-directional links.

FIG. 1 illustrates a network with bi-directional links. The number next to each link is the Interior Gateway Protocol ("IGP") link weight. For example, to illustrate segment routing, a connection that has to be established between nodes A and Z, using OSPF has packets which belong to the flow A-N-Q-P-Z which will be routed on the shortest path.

For example, assume that link N-Q and C-D are congested (i.e. hot-spots) and the goal is to route the packet on the path A-B-C-Q-P-Z, this is performed by breaking the path into two segments A-B-C and C-Q-P-Z.

In addition to the destination address Z, the segment labels C and Q are added to the header. The packet is routed from A to C along the shortest path A-B-C and at node C, the top label is popped and the packet is routed to Q. At node Q, the second label is popped and the packet is routed to Z along the shortest path.

There is no per-flow state at any of the intermediate nodes in the network. If there are no segment identifiers, then packets are routed along shortest paths as described in standard IGP routing protocols.

The other extreme occurs when each hop is specified in the packet header which is a form of explicit path routing. This control of the routing path enables the deployment of network functions like service chaining where the packet has to pass through a set of middle boxes when it goes from the source node to the destination node.

Segment routing can also be used for steering traffic to avoid hot-spots in the network and thereby improve network utilization.

There are two basic types of segments: node and adjacency. A node segment identifies a router node. Node segment identifiers are globally unique across the domain. An adjacency segment represents a local interface of a node. Adjacency segment identifiers are typically only locally significant on each node.

The MPLS data plane can be leveraged to implement segment routing essentially without modification since the same label switching mechanism can be used.

Segment labels are distributed across the network using simple extensions to current IGP protocols and hence Label Distribution Protocol ("LDP") and Resource Reservation Protocol-Traffic Engineering ("RSVP-TE") are no longer required for distributing labels.

Therefore, the control plane can be significantly simplified. Moreover, unlike MPLS, there is no need to maintain a path state in segment routing except on the ingress node, because packets are now routed based on the list of segments they carry in the header of the packet.

The ingress node has to be modified since it needs to determine the path and add the segment labels to the packet. For traffic planning problems, where the objective is to route traffic so that no link is overloaded, it is generally enough to consider segment routes with just two segments.

Figure 2:
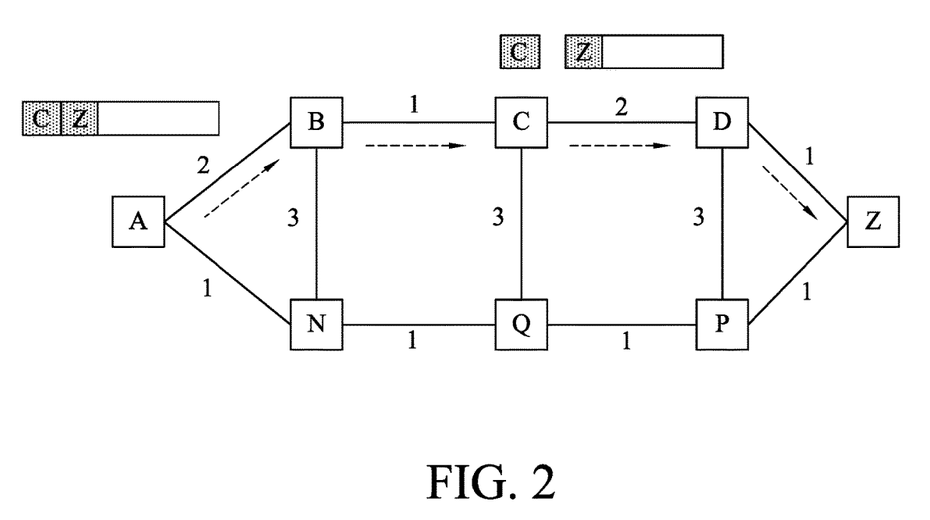
FIG. 2 illustrates an example of two segment routing.

For example, a two-segment route is shown in FIG. 2. In the case of two-segment routing, traffic is routed though one intermediate node. In FIG. 2, the path A-B-C-D-Z is represented as two segments, one from A to C and the other from C to Z.

SUMMARY OF EXEMPLARY EMBODIMENTS

A brief summary of various embodiments is presented below. Embodiments address the need to find the minimum hop path in the segment graph traversing the smallest number of links in the physical topology to ensure that the path that is outputted is not overlapping (i.e. each link in the physical topology is traversed only once).

In order to overcome these and other shortcomings of the prior art and in light of the present need to create minimum hop path in the segment graph traversing the smallest number of links in the physical topology, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments relate to a method for finding a minimum hop path in a segment graph traversing the least number of links in a physical topology, the method includes receiving a connection request for a connection between a source node and a destination node, computing the segment graph, the segment graph having a plurality of links, computing a bandwidth ("c(q)") for each of the plurality of links in the segment graph, computing the number of links for a shortest path ("N(q)") for each of the plurality of links, eliminating each of the plurality of link with a bandwidth less than the minimum bandwidth and selecting the shortest path in the segment graph between the source node and the destination node using a subset of the plurality of links.

In an embodiment of the present disclosure, the method further includes storing the shortest path in an optimum path set.

In an embodiment of the present disclosure, the bandwidth for each of the plurality of links in the segment graph calculated by $$c(q) = \min_{e \in SP(q)} c(e) \forall\, q \in G^s.$$

In an embodiment of the present disclosure, the number of links for the shortest path for each of the plurality of links calculated by $N(q)=|SP(q)| \forall q \in G^s$.

In an embodiment of the present disclosure, when the sum of a number of hops in the segment graph from the source node to a node v ("D(v)") and one is less than a number of hops from the source node to a node w ("D(w)"), then D(w) is equal to D(v)+1 and a number of links in the physical topology from the source node to the node w ("L(w)") is equal to the sum of a number of links from in the physical topology from the source node to the node v ("L(v)") and a number of links for a shortest path for link q ("N(q)"), which is one of the plurality of links.

In an embodiment of the present disclosure, when the sum of D(v) and one is equal to D(w) and the sum of L(v) and N(q) is less than L(w), then L(w)=L(v).

Various embodiments relate to a non-transitory machine-readable storage medium encoded with instructions executable to perform a method by a processor on a router, the machine-readable storage medium includes instructions for receiving a connection request for a connection between a source node and a destination node, instructions for computing the segment graph, the segment graph having a plurality of links, instructions for computing a bandwidth ("c(q)") for each of the plurality of links in the segment graph, instructions for computing the number of links for a shortest path ("N(q)") for each of the plurality of links, instructions for eliminating each of the plurality of link with a bandwidth less than the minimum bandwidth and instructions for selecting the shortest path between in the segment graph between the source node and the destination node using a subset of the plurality of links.

In an embodiment of the present disclosure, the non-transitory machine-readable storage medium 7, further includes instructions for storing the shortest path in an optimum path set.

In an embodiment of the present disclosure, the bandwidth for each of the plurality of links in the segment graph calculated by $$c(q) = \min_{e \in SP(q)} c(e) \forall\, q \in G^s.$$

In an embodiment of the present disclosure, the number of links for the shortest path for each of the plurality of links calculated by $N(q)=|SP(q)| \forall q \in G^s$.

In an embodiment of the present disclosure, when the sum of a number of hops in the segment graph from the source node to a node v ("D(v)") and one is less than a number of hops from the source node to a node w ("D(w)"), then D(w) is equal to D(v)+1 and a number of links in the physical topology from the source node to the node w ("L(w)") is equal to the sum of a number of links from in the physical topology from the source node to the node v ("L(v)") and a number of links for a shortest path for link q ("N(q)"), which is one of the plurality of links.

In an embodiment of the present disclosure, when the sum of D(v) and one is equal to D(w) and the sum of L(v) and N(q) is less than L(w), then L(w)=L(v).

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

A method and apparatus is needed to create a minimum hop path in the segment graph traversing the smallest number of links in the physical topology.

Dijkstra's algorithm finds the shortest path from a source node on a segment graph to a destination node on a segment graph without considering the number of links in the physical topology.

Segment routing uses shortest path fragments to transfer packets from the source node to the destination node. The method and apparatus described herein is directed towards an efficient way of instantiating a bandwidth guaranteed path by considering the number of links in the physical topology.

The efficiency of the segment representation of a path is measured by the number of segments used to instantiate the path.

The minimum label bandwidth guaranteed path problem requires a weighted directed graph G=(V, E), where V represents the set of nodes and E represents the set of links and w(e) represents the weight of link e∈E. The problem further requires a source node s, a destination node, d and a bandwidth guarantee, b.

The minimum label bandwidth guaranteed path problem then outputs a path P between s and d, having bandwidth at least b that uses the minimum number of labels.

The minimum label bandwidth guaranteed path problem seeks to solve the issue presented in the Constrained Shortest Path Problem ("CSPF") in IP networks where the objective is to find a minimum hop path between a source node and a destination node, having a minimum pre-specified amount of bandwidth.

For example, the network G=(N, E), where the nodes are routers are connected by directed links. Link e has an IGP link weight, w(e) and capacity, c(e).

The network, G=(N, E) uses segment routing and the label stack depth which is restricted to be at most h. Therefore, any path from source to destination can have at most h segments.

When there are multiple shortest paths between nodes then the network can split traffic across these equal cost paths.

In order to explicitly model the segments, we construct the segment graph $G^s$ of the given network G.

Figure 3A:
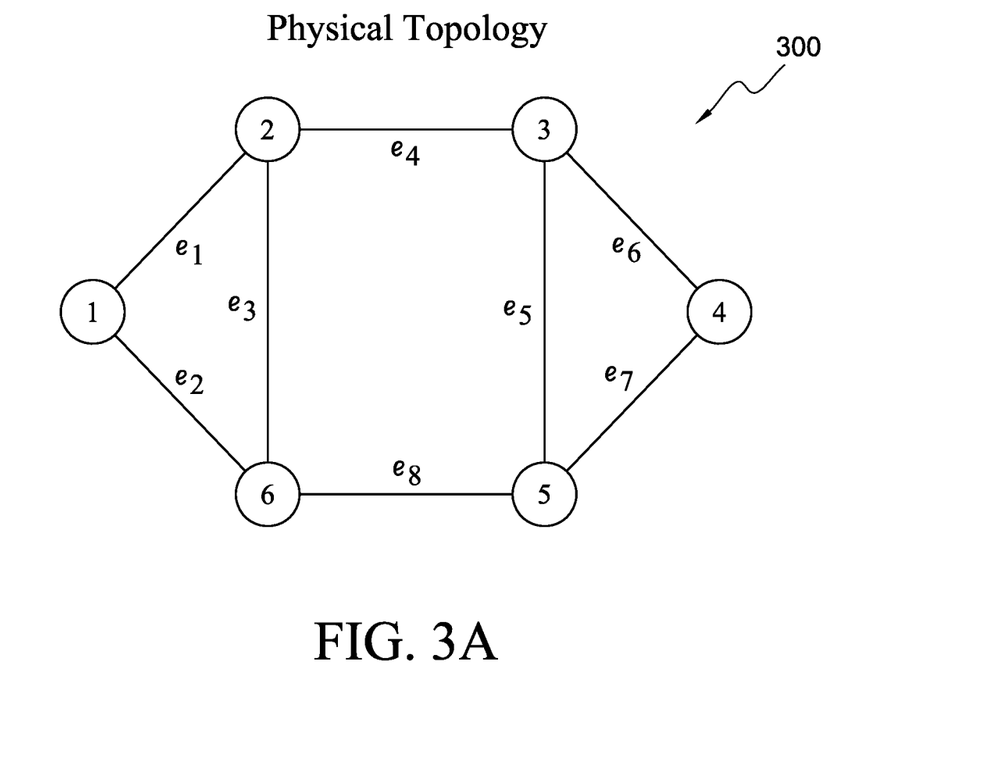
FIG. 3A illustrates a physical topology of network G.
Figure 3B:
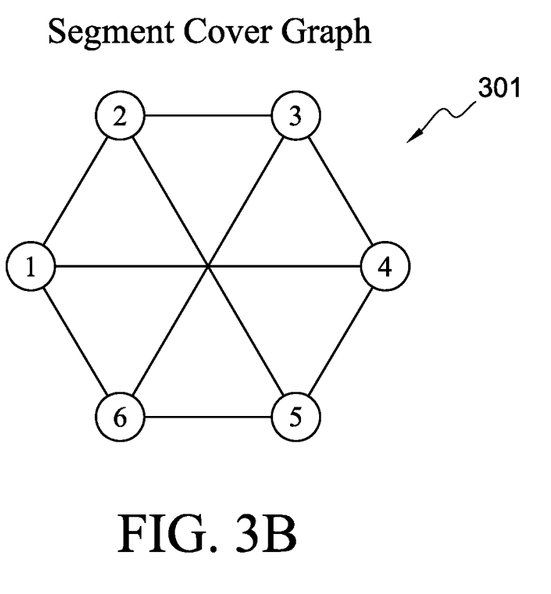
FIG. 3B illustrates a segment cover graph of network G.

FIG. 3A illustrates a segment graph, and FIG. 3B illustrates a physical topology for network G. The segment graph 301 is an overlay network on the physical topology 300 for network G.

Figure 3C:
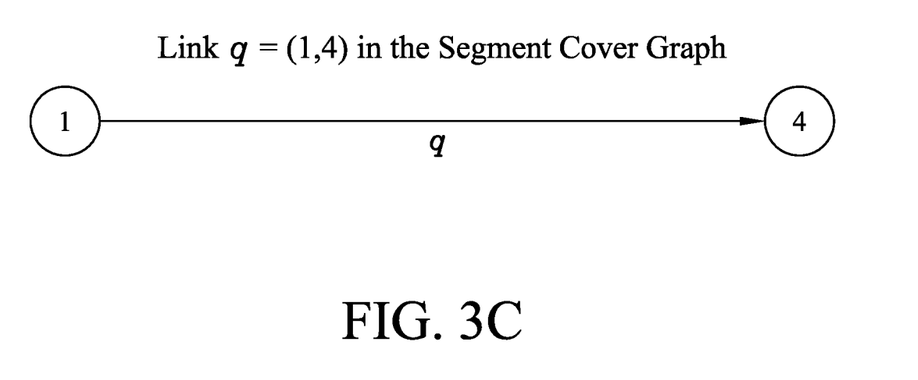
FIG. 3C illustrates link q=(1, 4) in the segment cover graph of network G.

FIG. 3C illustrates a link g=(u, v) in the segment graph which is the set of all links in the set SP (u, v). The set of links in the physical topology 300 correspond to link q in the segment graph by SP(q).

Given a segment q=(u, v), $F_q(e)=F_{uv}(e)$ represent the fraction of flow on link e when one unit of flow is sent on segment q.

The set SP(u, v) includes of all links that belong in any shortest path.

$F_{uv}(e)$ denotes the fraction of flow on link e when one unit of flow is sent from u to v.

Figure 3D:
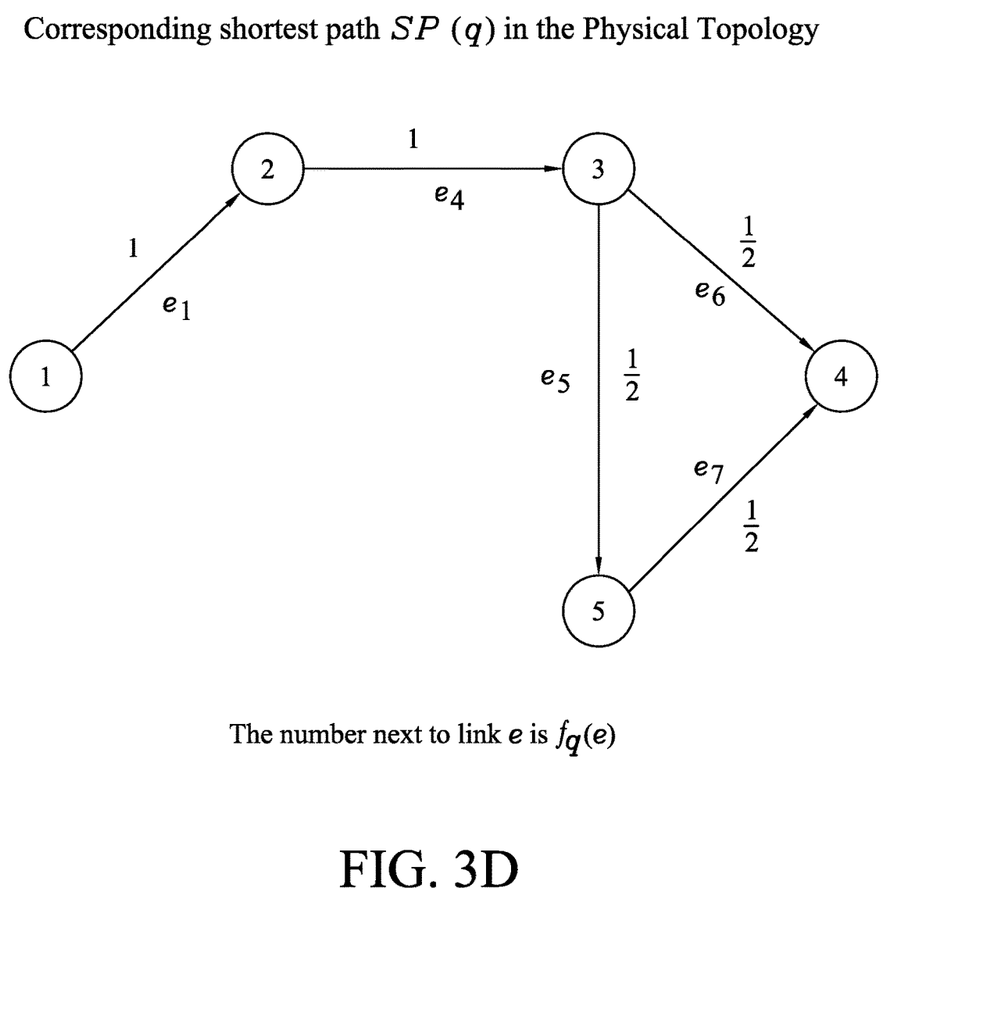
FIG. 3D illustrates the corresponding shortest path SP(q) in the physical topology of network G.

FIG. 3D illustrates the values of $F_q(e)$ for all links e for segment q=(1, 4). If the ECMP is not enabled, then SP(q) represents the unique shortest path that will be used for routing traffic between the nodes a(q) and b(q).

In this case, the capacity of link q in the segment graph in FIG. 3B is the minimum capacity link belonging to SP(q) of the physical topology in FIG. 3A.

If ECMP is enabled, then traffic can be split on multiple paths between a(q) and b(q). The exact path taken by a connection will depend on the hash computed on the packet header belonging to the connection.

Therefore, the lower bound on the minimum connection bandwidth when link q in the segment graph in FIG. 3B is used is $$c(q) = \min_{e \in SP(q)} c(e).$$

In a simple graph, finding the shortest path having a bandwidth guarantee of b can be computed by eliminating all links with bandwidth less than b and then computing the minimum hop path on the remaining graph. However, applying the same approach to a segment graph does not result in finding the shortest path having a bandwidth guaranteed.

Figure 4A:
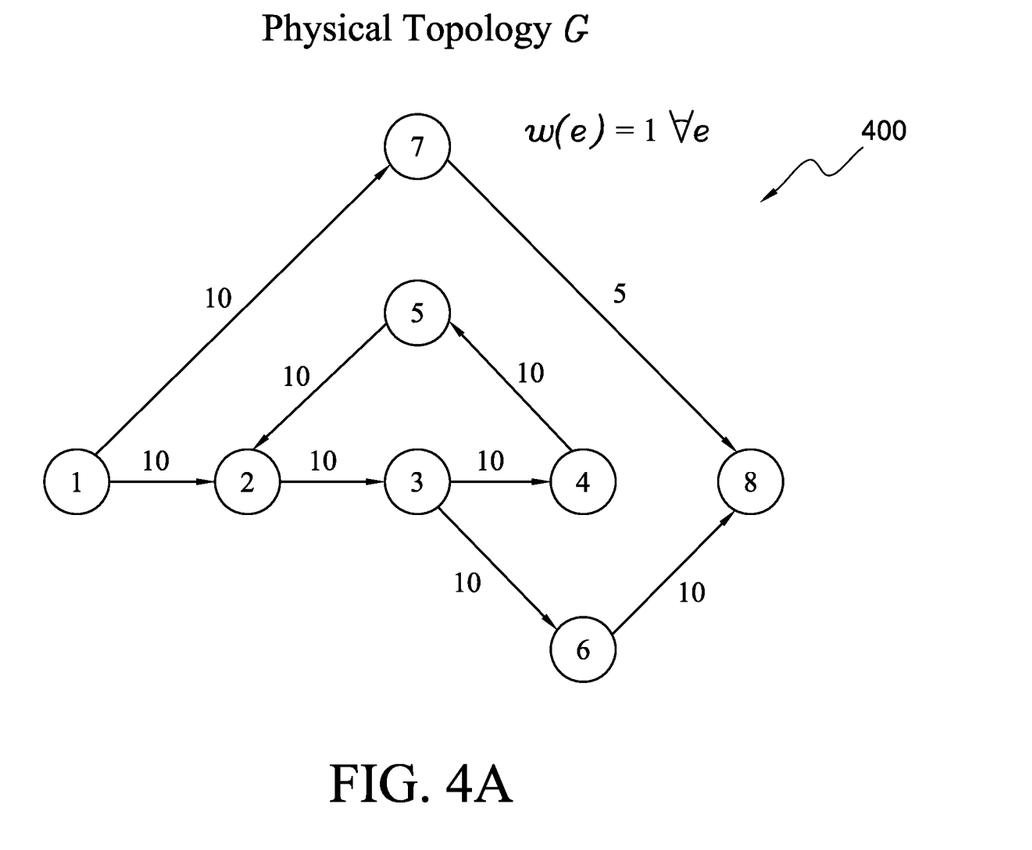
FIG. 4A illustrates a physical topology of network G.
Figure 4B:
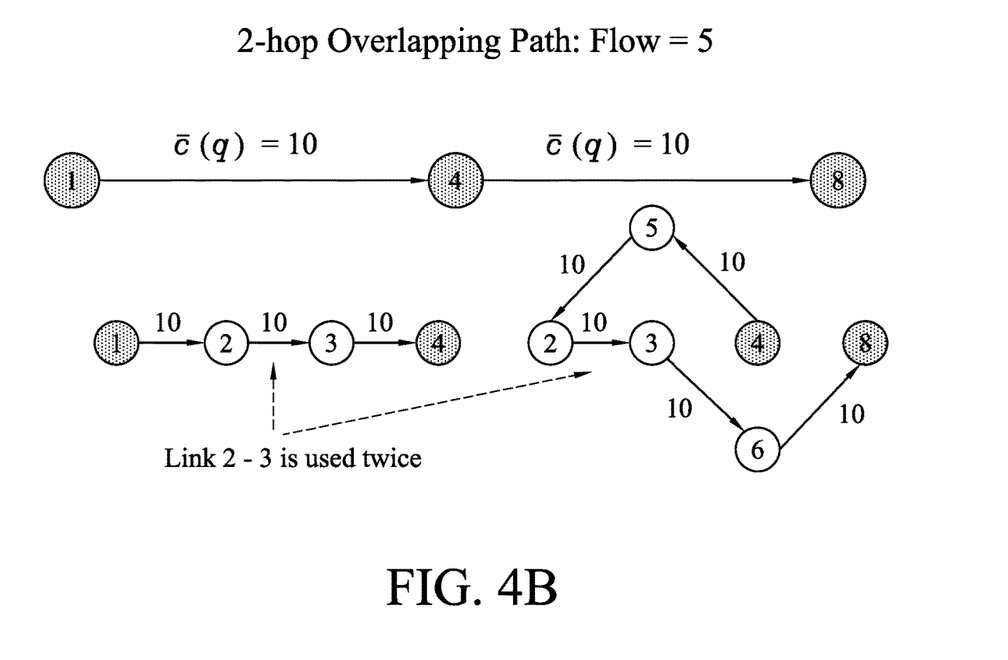
FIG. 4B illustrates a two hop overlapping path of network G.
Figure 4C:
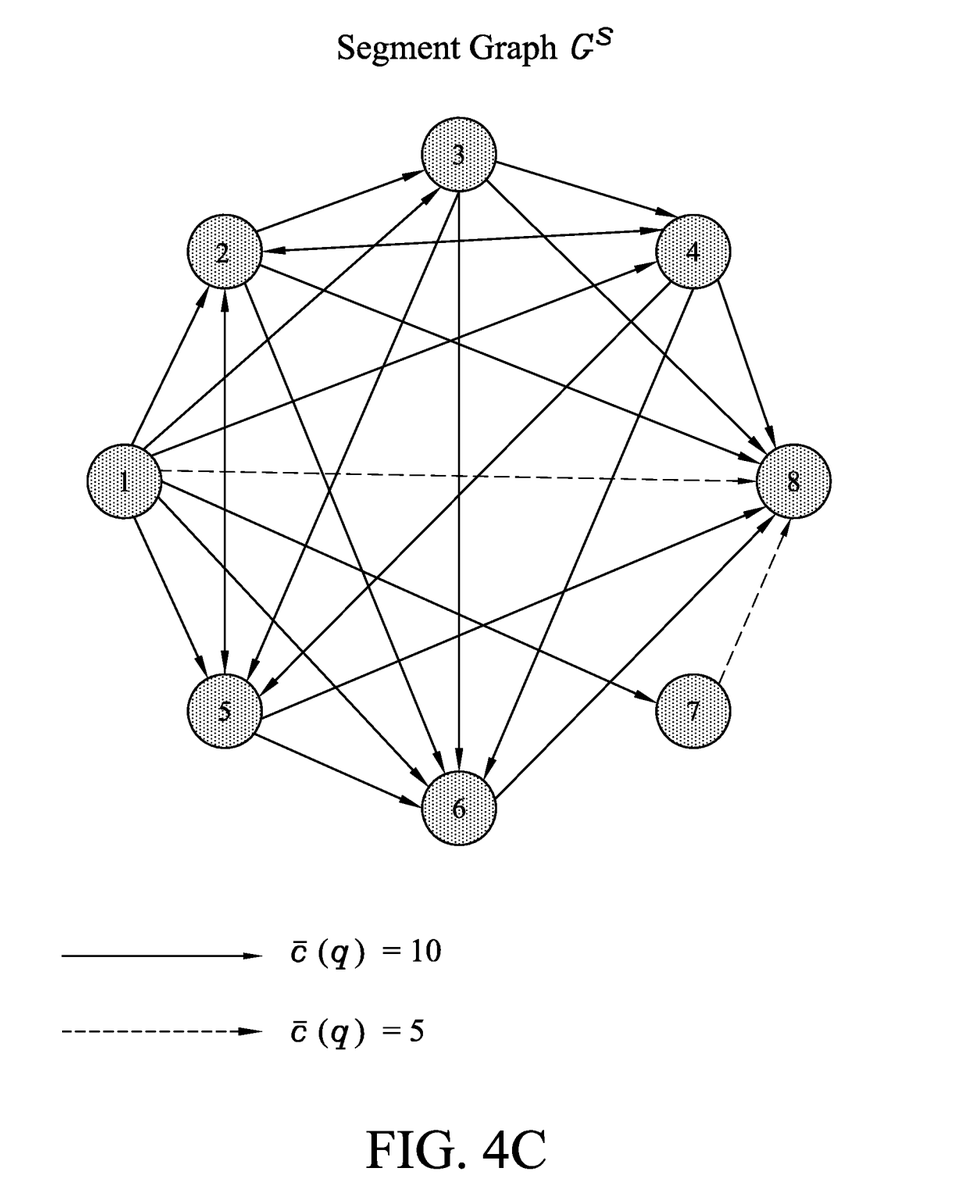
FIG. 4C illustrates a segment graph of network G.
Figure 4D:
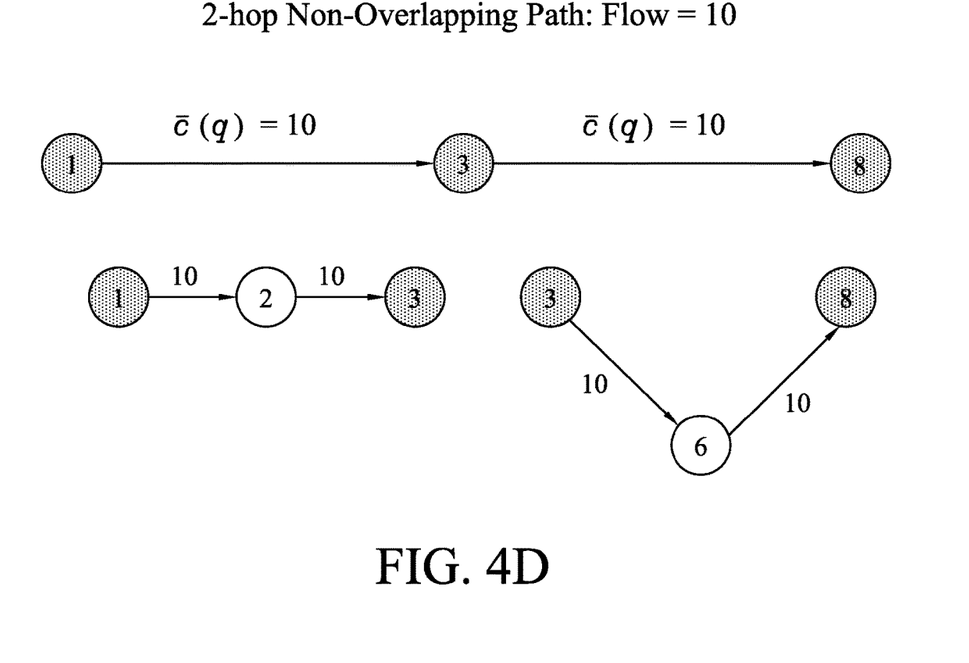
FIG. 4D illustrates a two hop non-overlapping path of network G.

For example, FIG. 4A illustrates a physical topology for network G, and FIG. 4C illustrates a segment graph for network G.

To find the most efficient path from node 1 to node 8 having a minimum guaranteed bandwidth of 10, a segment graph is constructed, as illustrated in FIG. 4C.

After the segment graph 402 is constructed, the capacity of each link in the segment graph 402 is computed and each link that has a capacity less than 10 (shown in dotted lines) is eliminated to ensure a minimum guaranteed bandwidth of 10.

After the links with a capacity less than 10 are eliminated, the minimum hop path from source node 1 to destination node 8 in the segment graph is determined.

For example, FIG. 4B illustrates a minimum hop path which may comprise links (1, 4) and (4, 8). Although both link capacities are 10, the minimum hop path traverses an arc in the physical topology 400 multiple times.

The segment graph 402 does not account for the arc being traversed multiple times in the physical topology.

The shortest path corresponding to link (1, 4) in the segment graph 402 is the path 1-2-3-4 in the physical topology 400.

Because all of these links have a capacity of 10, the value of c(q)=10 for link q=(1, 4) in the segment graph 402.

Similarly, the link q=(4, 8) in the segment graph 402, corresponds to the path 4-5-2-3-6-8 in the physical topology 400 and each link has a capacity 10.

If the path 1-4-8 in the segment graph 402 is used to route from source node 1 to destination node 8, then the link (2, 3) in the physical topology 400 is traversed twice. Therefore, the widest connection that can be routed on this path is 5 (the capacity is divided in half), which cannot be determined by the segment graph 402.

Therefore, a path in the segment graph 402 will be not overlapping (traverse any segment more than once) if and only if, for any two segments (q, r) on the path, SP(q) ∩SP(r)=0.

For any non-overlapping path P in the segment graph 402, the width of the path $$\Omega(P) = \min_{q \in c(q)}.$$

If the path P is overlapping, then $\Omega(P) \leq \min_{q \in p} c(q)$.

To illustrate the above method for creating a minimum hop path in the segment graph traversing the smallest number of links in the physical topology, a connection request for a path from a source node, s to a destination node, d with bandwidth b is received.

Algorithm 1 routes a connection between a source node, s and the destination node, d having bandwidth, b.

---
Algorithm 1 Routing a connection between s - d having bandwidth b
---
Input: Graph G, Link Capacity c(e), Source s, Destination d, Bandwidth b
Output: Path with bandwidth b between s and d having minimum
number of segments
  Construct the Segment Graph $G^S$
  Compute $c(q) = \min_{c \in SP(o)} c(\in) \forall_q \in G^S$
  Compute $N(q) = |SP(q)| \forall_q \in G^S$
  Eliminate all links q with $c(q) < b$
  $D(v) = \infty \forall_v, D(s) = 0$
  $L(v) = \infty \forall_v, L(s) = 0$
  $PRED(v) = \emptyset \forall c$
  $P = \{s\}$
  for j = 1,2, ..., n do
  |  v = Arg $\min_{\alpha \in P} D(u)$
  |  $P = P \cup \{v\}$
  |  for ($\forall_q = (v,w) \in G^S$) do
  |  |  if (D(v) + 1 < D(w)) then
  |  |  |  D(w) = D(v) + 1
  |  |  |  L(w) = L(v) + N(q)
  |  |  |  PRED(w) = v
  |  |  else if (D(v) + 1 = D(w) and L(v) + N(q) < L(w)) then
  |  |  |  L(w) = L(v) + N(q)
  |  |  |  PRED(w) = v
  |  |  end
  |  end
  end
  $P^* = \emptyset$
  u = v = d
  while (v ≠ s) do
  |  v ← PRED(u)
  |  if (v ≠ u) then
  |  |  $P^* \leftarrow P^* \cup (v,u)$
  |  end
  end
---

Algorithm 1 finds the minimum hop path in the segment graph traversing the smallest number of links in the physical topology. This ensures that the path that is outputted is not overlapping (i.e. each link in the physical topology is traversed at most once).

Because all links in the segment graph which have a capacity less than b, have been eliminated, the resulting path has bandwidth at least b.

There may be some links in the segment graph that could correspond to multiple ECMP paths in the physical topology but since we only retain links in the segment graph with $c(q) \geq b$, any of these ECMP paths will have bandwidth at least b.

Algorithm 1, which is directed towards routing a connection between a source node and a destination node having a bandwidth will be described. Algorithm 1 computes a segment graph. After the segment graph is created, the bandwidth c(q) is computed for each link q in segment graph using the hash function $$c(q) = \min_{e \in SP(q)} c(e) \forall\, q \in G^s.$$

After the bandwidth for each link q has been computed, the number of links N(q) in the shortest path corresponding to link q are computed by: $N(q) = |SP(q)| \forall_q \in G^s$.

Since a connection with bandwidth b has to be routed, after the bandwidth for each link q and the number of links in the shortest path are computed, all links in the segment graph with $c(q) < b$ are eliminated from the segment graph.

Each node has two values. The first value, D(v) for node v represents the number of hops in the segment graph from the source node, s to a node v in the algorithm and the second value L(v) represents the number of links in the physical topology between the source node, s and node v.

The number of hops in the segment graph from the source node, s to a node v is initialized to a value of infinite for all nodes v. The number of hops in the segment graph from the source node, s to the source node, s is initialized to 0. The number of links in the physical topology between the source node, s to the node v is initialized to a value of infinite for all nodes v. The number of links in the physical topology between the source node, s to the source node, s is initialized to 0.

The PRED function tracks the predecessor node and adds the next node to the visited set, P, which when the algorithm begins is defined as P={s}. The PRED function outputs the end result of the algorithm, specifically, the optimum path from the source node to the destination node.

Dijkstra's algorithm finds the shortest path from a source node on a segment graph to a destination node on a segment graph. As mentioned above, every node (except the source node which is given a cost of 0) has a cost of infinite.

Once node v is labeled, the algorithm scans out of node v to consider all links (v, w) in the segment graph. If D(w)=D(v)+1, then a tie is found between two segments. When a tie occurs, the tie is broken in favor of the segment with the lowest N(q), which is the lowest number of links in the physical topology.

Figure 5:
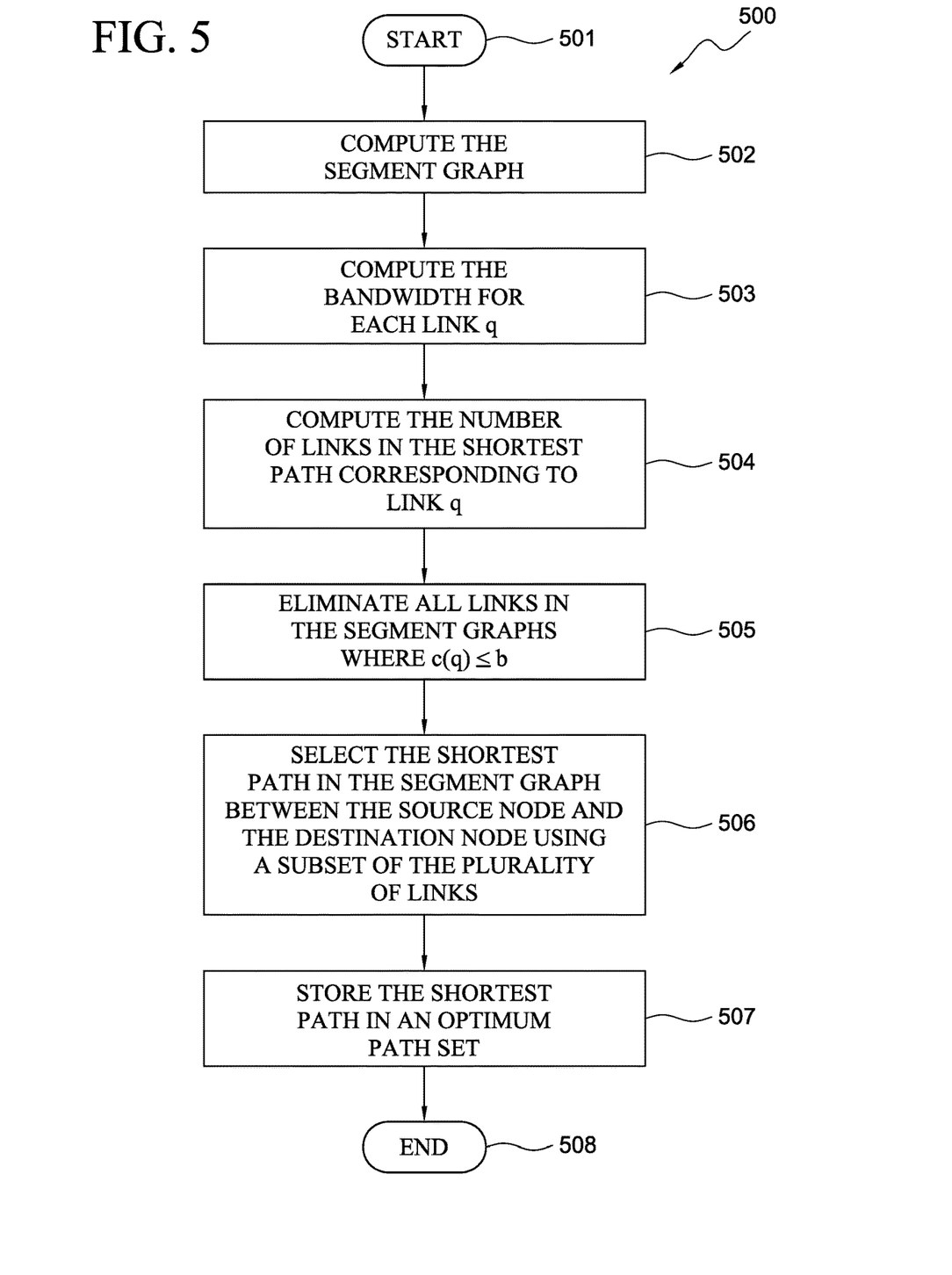
FIG. 5 illustrates a flow chart of a method for creating a minimum hop path in the segment graph traversing the smallest number of links in the physical topology.

FIG. 5 illustrates a flow diagram for a method 500 for creating a minimum hop path in the segment graph traversing the smallest number of links in the physical topology.

The method 500 begins at step 501. The method 500 then proceeds to step 502 where the segment graph is computed.

The method 500 then proceeds to step 503 where for each link q in the segment graph, the bandwidth c(q) is computed.

The method 500 then proceeds to step 504 where for each link q in the segment graph, the number of links N(q) in the shortest path corresponding to link q.

The method 500 then proceeds to step 505 where all links in the segment graph where $c(q) \leq b$ are eliminated to ensure that a connection with bandwidth, b is established.

The method 500 then proceeds to step 506 where the shortest path in the segment graph between the source and the destination is selected using a subset of the plurality of links.

The method 500 then proceeds to step 507 where the shortest path is stored in an optimum path set.

The method 500 then ends at step 508.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for finding a minimum hop path in a segment graph traversing a least number of links in a physical topology, the method comprising:
   receiving a connection request for a connection between a source node and a destination node;
   computing the segment graph, wherein the segment graph has a plurality of links;
   computing a bandwidth ("c(q)") for each of the plurality of links in the segment graph;
   computing a number of links for a shortest path ("N(q)") for each of the plurality of links;
   eliminating each of the plurality of links with a bandwidth less than a minimum bandwidth to define a subset of the plurality of links, and
   selecting the shortest path in the segment graph between the source node and the destination node using the subset of the plurality of links based, for each node between the source node and the destination node, upon a number of hops in the segment graph from the source node and a number of links in the physical topology from the source node.

2. The method of claim 1, further comprising:
   storing the shortest path in an optimum path set.

3. The method of claim 1, further comprising:
   calculating the bandwidth for each of the plurality of links in the segment graph by $$c(q) = \min_{e \in SP(q)} c(e) \forall\, q \in G^s.$$

4. The method of claim 1, further comprising:
   calculating the number of links for the shortest path for each of the plurality of links by $N(q)=|SP(q)| \forall q \in G^s$.

5. The method of claim 1, wherein when the sum of the number of hops in the segment graph from the source node to a node v ("D(v)") and one is less than the number of hops from the source node to a node w ("D(w)"), then D(w) is equal to D(v)+1 and the number of links in the physical topology from the source node to the node w ("L(w)") is equal to the sum of the number of links in the physical topology from the source node to the node v ("L(v)") and the number of links for a shortest path for link q ("N(q)"), which is one of the plurality of links.

6. The method of claim 5, wherein when a sum of D(v) and one is equal to D(w) and a sum of L(v) and N(q) is less than L(w), then L(w)=L(v).

7. A non-transitory machine-readable storage medium encoded with instructions executable to perform a method by a processor on a router, the non-transitory machine-readable storage medium comprising:
   instructions for receiving a connection request for a connection between a source node and a destination node;
   instructions for computing a segment graph, the segment graph having a plurality of links;
   instructions for computing a bandwidth ("c(q)") for each of the plurality of links in the segment graph;
   instructions for computing a number of links for a shortest path ("N(q)") for each of the plurality of links;
   instructions for eliminating each of the plurality of links with a bandwidth less than a minimum bandwidth, and
   instructions for selecting the shortest path in the segment graph between the source node and the destination node using a subset of the plurality of links based, for each node between the source node and the destination node, upon a number of hops in the segment graph from the source node and a number of links in the physical topology from the source node.

8. The non-transitory machine-readable storage medium of claim 7, further comprising:
   instructions for storing the shortest path in an optimum path set.

9. The non-transitory machine-readable storage medium of claim 7, further comprising:
   instructions for calculating the bandwidth for each of the plurality of links in the segment graph by $$c(q) = \min_{e \in SP(q)} c(e) \forall\, q \in G^s.$$

10. The non-transitory machine-readable storage medium of claim 7, further comprising:
 instructions for calculating the number of links for the shortest path for each of the plurality of links by $N(q)=|SP(q)| \forall q \in G^s$.

11. The non-transitory machine-readable storage medium of claim 7, wherein when the sum of a number of hops in the segment graph from the source node to a node v ("D(v)") and one is less than the number of hops from the source node to a node w ("D(w)"), then D(w) is equal to D(v)+1 and the number of links in the physical topology from the source node to the node w ("L(w)") is equal to the sum of the number of links from in the physical topology from the source node to the node v ("L(v)") and the number of links for a shortest path for link q ("N(q)"), which is one of the plurality of links.

12. The non-transitory machine-readable storage medium of claim 11, wherein when a sum of D(v) and one is equal to D(w) and a sum of L(v) and N(q) is less than L(w), then L(w)=L(v).

* * * * *